CHAIN OSCILLATOR IN A MULTIPLEX SYSTEM

Filed Dec. 31, 1947

Inventor
HAROLD GOLDBERG
By Robert T. Killman
Attorney

CHAIN OSCILLATOR IN A MULTIPLEX SYSTEM

Filed Dec. 31, 1947

2 Sheets-Sheet 2

Inventor

HAROLD GOLDBERG

By Robert T. Kellman

Attorney

United States Patent Office 2,740,893

Patented Apr. 3, 1956

2,740,893

CHAIN OSCILLATOR IN A MULTIPLEX SYSTEM

Harold Goldberg, Towson, Md., assignor to Bendix Aviation Corporation, Towson, Md., a corporation of Delaware Application December 31, 1947, Serial No. 795,072

2 Claims. (Cl. 250—36)

Figure 1:
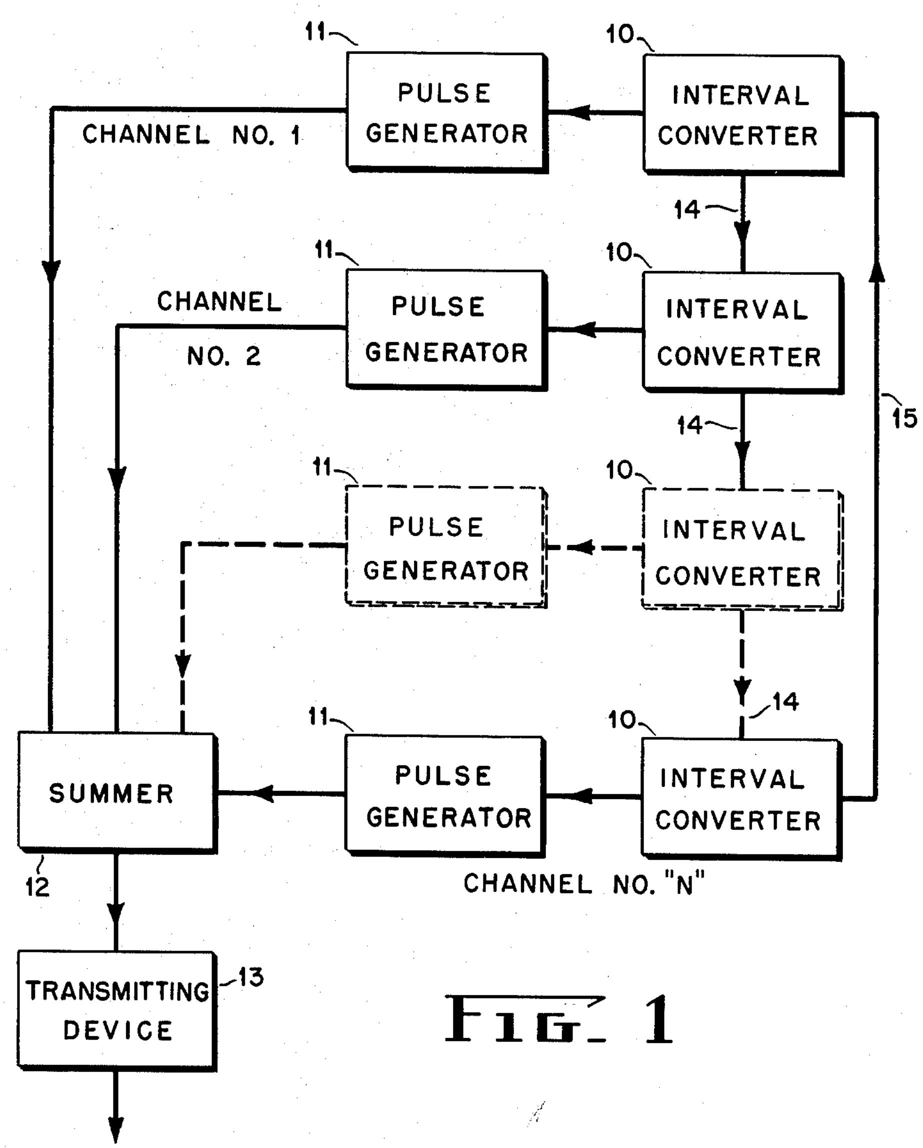

This invention relates to a system of time division multiplexing using pulse modulation techniques.

Previously known time division multiplex systems operate in the following manner. If *n* channels are to be utilized and if *f* is the highest frequency to be transmitted thereover, a basic repetition rate in excess of 2*f* is established by a stable oscillator. Pulses derived from this source at the basic repetition rate establish the reference for the periodic transmission of the information in each of the *n* channels. In other words, following the transmission of this basic or synchronizing pulse, pulses corresponding to the information in each of the *n* channels in sequence are transmitted before the next basic, or synchronizing, pulse.

The channel pulses transmit information as follows. The time between synchronizing pulses T, which is the reciprocal of the basic repetition rate R, is divided into *n* equal intervals. Starting with the first, these are numerically assigned to the *n* channels, 1 to *n*. Each of these intervals is a channel time space, during which the corresponding channel information is transmitted by means of the position of a pulse therein. (The information conveyed by the channel is actually defined by the interval between the synchronizing pulse and the channel pulse.) Thus, the channel information for channels 1 to *n* is transmitted sequentially following a synchronizing pulse and this sequence is repeated at the rate R.

In the previously known systems the channel pulse is sent at the center of the channel interval if the channel input is zero. Positive and negative channel input amplitudes are linearly translated into delays and advances relative to the center of the channel interval, or vice versa.

The operation of systems of the foregoing type is subject to certain disadvantages. For example, the synchronizing pulse carries no information. Thus, in every period T, *n* plus 1 pulses are required to convey information over *n* channels. While this is of little importance for large values of *n*, it becomes a matter of considerable importance when n is small. Furthermore, if the synchronizing pulse is characterized by a greater pulse length than that of the channel pulses, for values of *n* less than 10 a considerable portion of the average transmitted power is being sent merely as a reference, without inherently carrying any information.

Guard intervals, which represent a loss in transmission time utilization, must be established between channel intervals. The use of this lost time would provide a greater signal to noise ratio for the same number of channels or a greater number of channels for the same signal to noise ratio.

Clippers or compressors must be employed to prevent channel pulses from getting out of their assigned intervals, since overmodulation results in very objectionable distortion. The clippers will in themselves, of course, cause distortion in the offending channel.

It is an object of the present invention to provide a time division multiplex system which is free from the above defects.

It is a further object of the invention to provide a multiplex system in which the guard intervals between channels may be greatly reduced.

It is another object of the invention to provide a multiplex system in which overmodulation results in very little distortion which is easily maintained at a harmless level.

It is still another object to provide a multiplex system in which the synchronizing pulse may carry channel information.

It is a still further object to provide a multiplex system in which it is impossible to overmodulate in the sense that channel pulses will occur in other than normal sequence.

The above and other objects are realized by a system in which each channel interval, the magnitude of which is a function of the information it carries, is measured, not from the synchronizing pulse, but from the termination of the pulse of the preceding channel. The channel interval has a reference magnitude for a condition of no modulation. It varies in magnitude about this reference magnitude as a function of the modulation applied. The *n*th channel is terminated by the synch pulse, the trailing edge of which also marks the beginning of channel No. 1.

Figure 2:
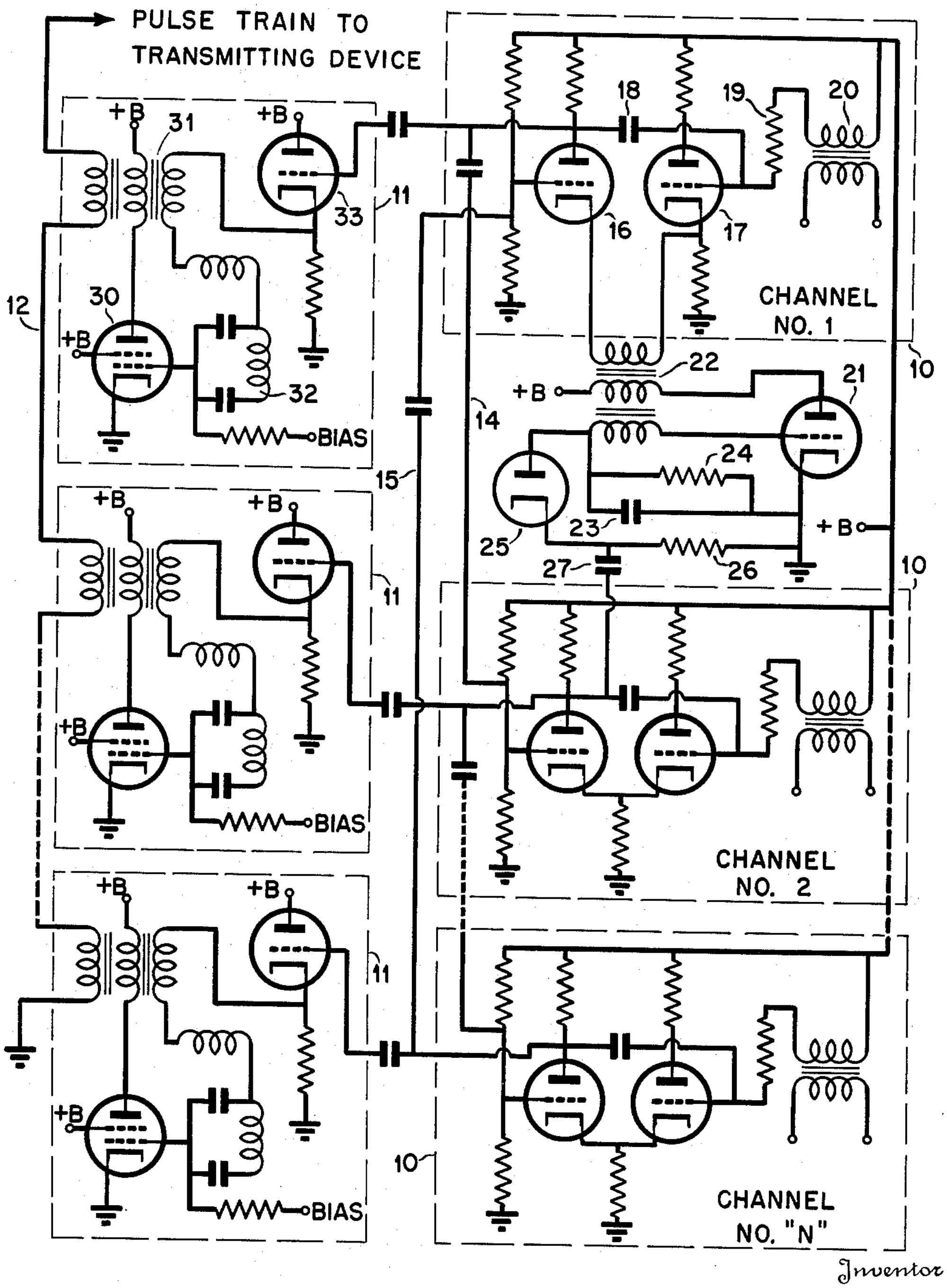

Referring now to the drawing:

Fig. 1 is a block diagram of the transmitter of a system embodying the invention; and, Fig. 2 is a schematic diagram of the circuit of the transmitter of Fig. 1 showing the components thereof in more detail.

With more particular reference to the drawing, Fig. 1 illustrates a transmitter provided with a number of sequentially connected interval converters represented by the blocks 10. Each converter relates to a respective channel as indicated, the converter of channel *n* being connected to the converter of channel 1.

To each converter is also connected a respective pulse generator indicated by the blocks 11. The outputs of all the pulse generators are applied to a summer 12 the output of which operates a transmitting device 13. The method of transmission is immaterial. If carrier transmission is used the device 13 is a carrier generator.

Information to be transmitted in any particular channel is applied to the interval converter of that channel. Each of these converters has the property that it may be triggered into a state different from its resting state and will remain in that state for an interval determined by the information reaching it from its channel input. When it returns to its resting state, it triggers off the next converter 10 in the sequence by means of the sequential connection 14 shown. When the converter of the *n*th channel returns to its equilibrium state, it triggers off the converter of channel No. 1 by way of the connection 15. In this way, the separate channel intervals are generated in sequential fashion. The chain acts as a form of oscillator, the group time being a function of the information on all of the channels.

The return to equilibrium of any converter 10 not only triggers the following converter but also triggers the pulse generator 11 connected to it, which generator operates once for each trigger. The pulse generator of channed No. 1 generates the synchronizing pulse. The remaining pulse generators are all alike and generate identical channel pulses. The synchronizing pulse may be different from the channel pulses in shape, amplitude, width, etc. If desired it may be a multiple pulse with a definite coding.

Fig. 2 shows the transmitter in more detail. Each interval converter 10 comprises a "flip-flop" circuit which is a relaxation oscillator of the multivibrator type having one stable and one unstable condition. Since the multivibrator circuits are identical, the description will be confined to that of the No. 1 channel.

The multivibrator circuit of this interval converter comprises the two tubes 16 and 17 coupled by a time constant circuit comprising the condenser 18 and resistor 19. In the equilibrium state of the multivibrator the tube 16 is nonconducting and the tube 17 is conducting. Upon the application to the control grid of the tube 16 of the equilibrium voltage output of the *n*th stage the tube 16 is rendered conducting and the multivibrator goes into its unstable state. The duration of this state is determined by the values of the time constant circuit.

Modulation of the channel interval is accomplished by the application of modulation voltage through a transformer 20 the secondary of which is in series with the resistor 19. This voltage varies, in accordance with its magnitude, the time required for the discharge of condenser 18 to the firing level of tube 17. The output of the multivibrator is taken from the anode of tube 16 by conductor 14.

Some means is required for initiating the oscillation and to reestablish it if it ceases. It is necessary that the initiating device trigger only one circuit once and then remain quiescent unless the oscillation fails. If this occurs, the device must again trigger the chain a single time and then remain inoperative as long as oscillation continues.

This is accomplished by a blocking oscillator circuit comprising tube 21 having its grid and anode circuits inductively coupled to each other and to the cathode of tube 16. Connected between the grid of this tube and ground is a condenser 23 by-passed by a resistor 24. A diode 25 has its anode connected to the ungrounded end of resistor 24 and its cathode connected to the junction point of a condenser 27 and a resistor 26 which are connected in series between the output of the following interval converter and ground. Additional diodes connected to other interval converters may be used if necessary.

When the circuit is first energized, the capacitor 23 is uncharged. Under this condition the blocking oscillator will fire. The pulse produced initiates the chain oscillation. The firing of the blocking oscillator also results in the negative charging of condenser 23 which blocks the oscillator until enough charge leaks off through resistor 24 to reduce the grid voltage to the firing point. The condenser 23 is connected, however, to one or more elements of the oscillator chain through diodes such as 25. The initiation of an unstable state in a chain element to which a diode 25 is connected causes condenser 23 to be charged negatively again. As long as the chain continues to run, and the time constant RC of components 23, 24 is sufficiently long, the blocking oscillator cannot fire. If the chain stops oscillating, the charge on 23 leaks off and the blocking oscillator again operates to start to the oscillation. The time required to reinitiate the oscillation after the cessation of oscillation is a function of the time RC. This time may be made shorter by using several chain oscillator elements to charge the condenser 23.

As pointed out above, completion of the transmitter requires the derivation of a train of pulses corresponding to the interval division times. The pulse generators 11 and the summer 12 which perform this function are shown schematically in Fig. 2. Since the pulse generators are identical in make-up, only the one operating upon the output from the interval generator of channel No. 1 will be described.

Each pulse generator 11 comprises a blocking oscillator having a delay network and generating approximately rectangular pulses. The blocking oscillator comprises a tube 30 having its grid and anode inductively coupled as indicated at 31. The grid circuit is provided with a delay line 32 and the output of the respective interval generator is applied to the grid circuit by way of a cathode follower 33. The pulse length depends upon the time constant of the delay network. One method of characterizing the synchronizing pulse is to make it longer than the others.

Summation of the pulses to form a pulse train may be accomplished by a number of methods, the one illustrated here involving a circuit 12 comprising a series of inductors, inductively coupled to the output circuits of the various pulse generators. The summed pulses are then transmitted either as video pulses, or by modulating a carrier.

In the foregoing, the embodiment of the invention now preferred has been disclosed. Many modifications in circuit structure and arrangement falling within the scope of the invention will, however, be apparent to those skilled in the art.

What is claimed is:

1. In a pulse time multiplexing system comprising a chain oscillator composed of elements, each of which has a normal stable state and is capable of being triggered into a temporary unstable state, the return of each of said elements to its stable state triggering the next following element into an unstable state; means for reestablishing said chain oscillation upon its interruption, said means comprising a blocking oscillator having its output coupled to one of said elements whereby the operation of said blocking oscillator excites said chain oscillator into operation, an energy storage device forming a part of said blocking oscillator and when charged maintaining said blocking oscillator in its blocked condition, means bleeding the charge from said device and means recharging said device from the output of a succeeeding element of said chain oscillator.

2. The combination comprising a chain oscillator formed of a plurality of sequentially connected oscillating elements, the oscillation of each element triggering the next succeeding element into oscillation, and means for reestablishing oscillation in said oscillator upon interruption thereof, said means comprising a blocking oscillator having its output coupled to one of said elements whereby operation of said blocking oscillator initiates oscillations in said chain oscillator, said blocking oscillator including an energy storage device which when charged maintains said blocking oscillator in its blocked condition, means bleeding the charge from said device and means recharging said device from the output of a succeeding element of said chain oscillator.

References Cited in the file of this patent

UNITED STATES PATENTS

| | | |
|---|---|---|
| 1,848,839 | Ranger | Mar. 8, 1932 |
| 2,418,116 | Grieg | Apr. 1, 1947 |
| 2,419,292 | Shepard | Apr. 22, 1947 |